(No Model.)

R. KEITH.
EGG HOLDER.

No. 325,935. Patented Sept. 8, 1885.

Witnesses:
Jas. F. DuHamel
Walter S. Dodge

Inventor:
R. Keith,
by Dodger Son
Attys.

N. PETERS, Photo-Lithographer, Washington, D.C.

UNITED STATES PATENT OFFICE.

REUEL KEITH, OF WASHINGTON, DISTRICT OF COLUMBIA.

EGG-HOLDER.

SPECIFICATION forming part of Letters Patent No. 325,935, dated September 8, 1885.

Application filed June 22, 1885. (No model.)

*To all whom it may concern:*

Be it known that I, REUEL KEITH, of Washington, in the District of Columbia, have invented certain new and useful Improvements in Egg-Holders, of which the following is a specification.

This invention relates to that class of egg-holding devices used in the shipment of eggs; and the invention consists in a sheet of straw-board or similar material provided with perforations, with strips of paper or similar flexible material secured thereto in such a manner as, in connection with the perforations, to form a series of pockets for holding the eggs, as hereinafter more fully described.

Figure 1:
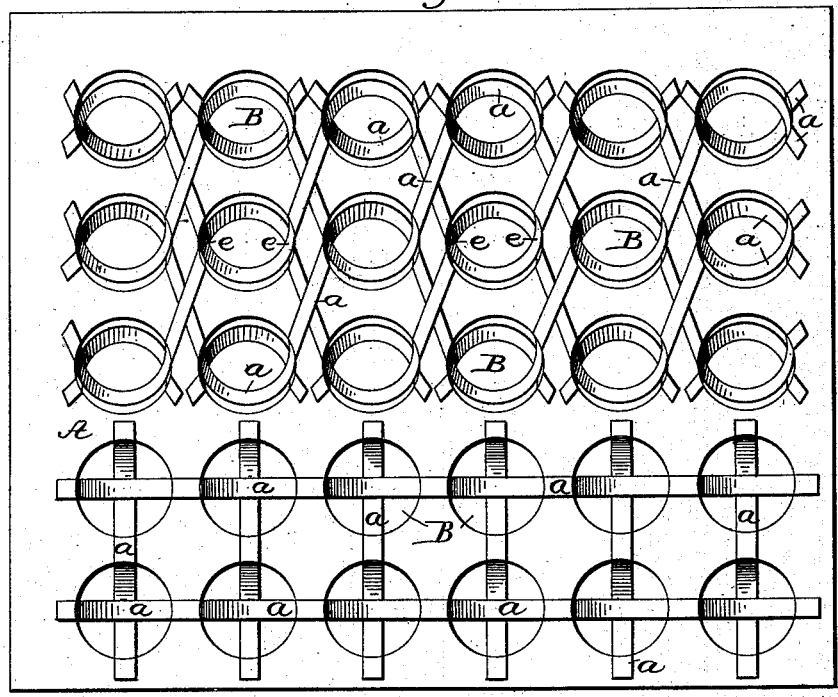
Figure 2:
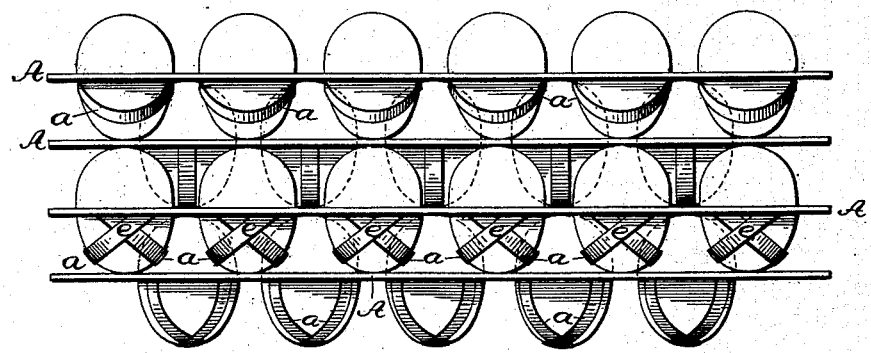

Figure 1 is a top plan view of one of the sheets with the flexible strips applied; and Fig. 2 is an edge view showing the manner of arranging the same, with the eggs set therein for transportation.

A great variety of devices have been devised from time to time to hold eggs and enable them to be shipped or transported with safety, but few of which, however, have been adopted or are in practical use, owing to their cost of construction and various other reasons.

The object of my present invention is to produce an egg-holder which shall be cheap to construct and efficient in use.

To construct my improved device I take a sheet of straw-board or any similar cheap material and perforate it, forming a series of holes, B, of proper size to permit an egg to be set in each hole, the holes being arranged in rows, as shown in Fig. 1, in regular order and equidistant from each other. I then take narrow strips $a$, of Manila or other strong paper, or similar flexible material, and paste or otherwise fasten them to the sheet A in such a manner as to cross the holes B, as shown in Fig. 1. In the lower part of Fig. 1 I have shown these strips $a$ so arranged as to cross each other at right angles at the center of the holes B, the strips $a$ being depressed in the form of a loop where they cross the hole B, thus forming in each hole B two depending loops crossing each other at right angles, of a depth about equal to one-half the length of an ordinary egg, as shown at the lower part of Fig. 2. In this way I form a series of pockets in which the eggs can be set and securely held, the eggs in this case resting on their points on the loops at their point of junction, as shown clearly in the lower part of Fig. 2, the eggs, when a sheet is lifted, being each supported by the flexible loops; or, if preferred, the strips $a$, instead of crossing the holes B and each other at right angles, may be arranged diagonally, as shown in the upper part of Fig. 1. In that case the strips $a$ will cross each other within each hole B on its opposite sides, as shown at $e\ e$, Figs. 1 and 2, and thereby leaving a space between at the bottom for the point of the egg, the egg being supported by the strips $a$, which in that case will pass around and partially under it diagonally on its opposite sides, as shown clearly in Fig. 2, and in which case the point of the egg will occupy the open space between the loops or strips.

Either arrangement of the strips $a$ may be adopted at will, it being mainly if not wholly a matter of choice or convenience, the result being, in either case, to produce a flexible pocket or support for the egg.

In perforating the sheets A the perforations in one sheet will be arranged so as to come directly over the solid or imperforated portions of the next sheet, as shown in Fig. 2, so that when the filled sheets are placed one upon another, as shown in Fig. 2, the projecting ends or portions of the eggs will fit in between those of the adjoining sheet. As these perforations will be made by machinery, it is only necessary to leave a wider margin at two edges of the sheet, as shown in Fig. 1, and then when placing them in a box to alternate them by placing the wider margin first at one side and next at the opposite side, and so on until the box is filled.

It is designed to make the perforations of such a size that the eggs will fill them when set therein, or as nearly so as is practicable, and to locate them at such distances apart as to leave sufficient space for the eggs of the next sheet to fit in between the eggs of the first sheet and have their points rest on said first sheet, as shown in Fig. 2, and so on throughout the series. In this way quite a number of these filled sheets can be placed one above another in a box of a size corresponding to that of the sheets without danger of crushing or breaking the eggs, it only being necessary to place some paper, straw, or other soft material over the upper layer before the cover is shut or put on. When thus arranged, it will be seen that the weight of each sheet, with the eggs therein, will be supported by the one next below it, and that, consequently, the weight of the mass above will be supported by the lower sheet and its eggs; and although at first sight it might be thought that the eggs at or near the bottom would be crushed, I have found by experiment that such is not the case. The difficulty of crushing an egg by end pressure is well known, and as by this arrangement the eggs are all held securely in position, so that the weight is applied in the plane of their longer axis, or lengthwise, a considerable number of these holders filled with eggs and placed one upon another, as shown in Fig. 2, can be thus packed and carried in safety in a suitable box or case. Another advantage of this arrangement is, that a larger number of eggs can be packed in a given space than when separate drawers or trays with covers are used for each layer of eggs, and thus the size of the boxes or cases for a given number of eggs can be reduced, thereby reducing the first cost, and also the room required for transportation and storage; or, if it be preferred, these holders may be carried in boxes which have cleats at its sides, upon which the sheets A can be supported at such distances from each other as to prevent the eggs in one sheet from resting on or touching the other sheet or the eggs therein, in which case each egg will be supported separately by the flexible strips $a$ of its pocket or perforation; or, instead of fixed cleats, loose strips may be used to support the sheets in the same manner, either plan being adopted as may be found most convenient in practice, the gist of my invention consisting of the holders themselves, and not in the manner of supporting them in the box.

I am aware that flexible pockets for carrying eggs have been formed by a series of straps and cords with rigid vertical partitions secured within rigid frames constructed to form sections of a box, and also that sheets of strawboard have had cells formed therein for the reception of eggs by first forming up the cells or cups and securing them to the sheets or boards, and also by cutting slits crosswise of each other in the sheet, and then bending the points downward; also, that a tray has been patented composed of two sheets of thin material secured in frames hinged together, one of said sheets being provided with holes having loops formed therein by bands crossing each other at right angles, and having a frame composed of rigid cross-pieces attached thereto, the other part of said tray being provided with holes without loops, and therefore I do not claim any of these; but, Having fully described my invention, what I do claim is—

As a new article of manufacture, an egg-holder consisting of a single sheet of strawboard or similar material, provided with a series of perforations or holes, B, and having the flexible strips $a$ secured thereto, as shown and described.

REUEL KEITH.

Witnesses:
H. A. HALL,
W. C. DODGE.